Dec. 19, 1967 W. RICHTER 3,358,492
MANDREL CONSTRUCTION
Filed Sept. 8, 1965
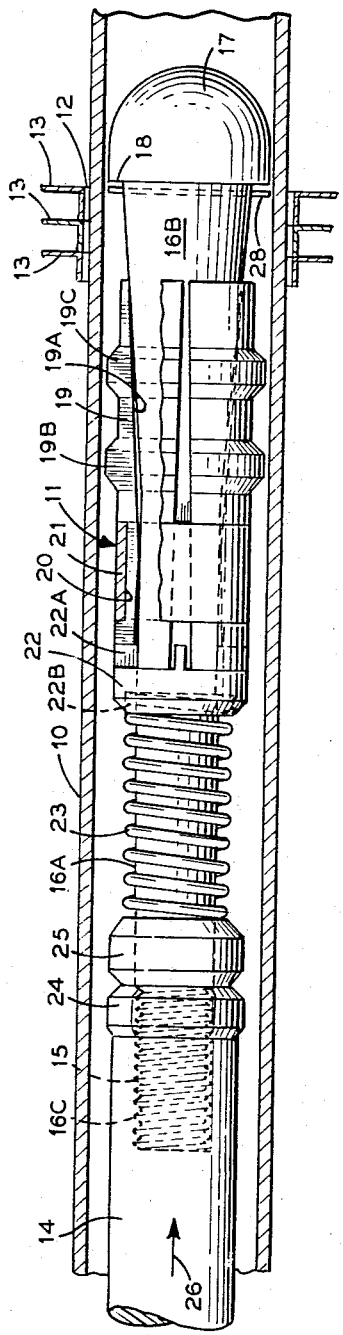
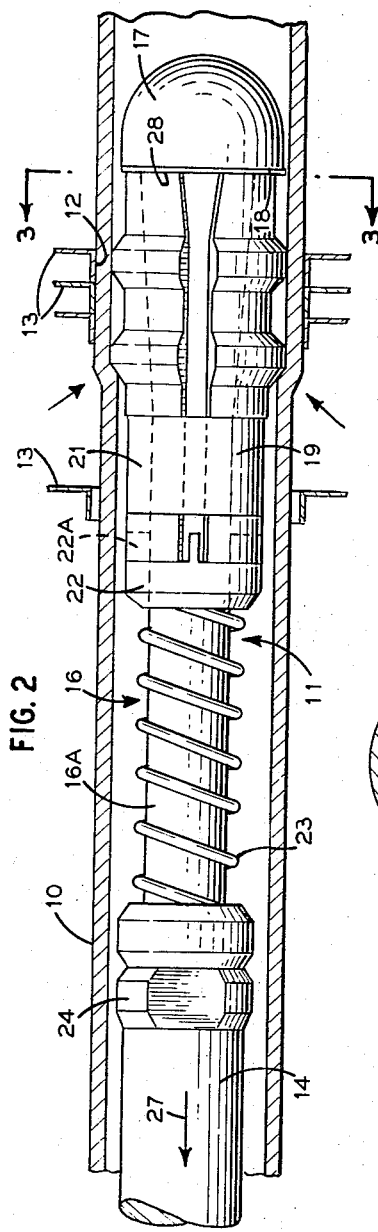
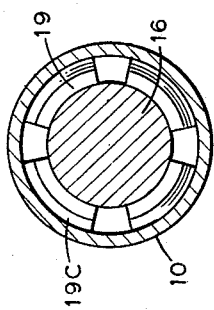
INVENTOR.
Walter Richter
BY
ATTORNEY

United States Patent Office 3,358,492
Patented Dec. 19, 1967

3,358,492
MANDREL CONSTRUCTION
Walter Richter, Syosset, N.Y., assignor to Embassy Industries, Inc., Farmingdale, N.Y., a corporation of New York
Filed Sept. 8, 1965, Ser. No. 485,881
11 Claims. (Cl. 72—393)

ABSTRACT OF THE DISCLOSURE

This invention is directed to an expandable mandrel which is connected to the end of a pushrod which can be readily passed through the bore length of a tube in both directions but which will effect expansion of the tube when moved in one direction only. This is attained by a mandrel which comprises a shank which may be detachably connected to the end of a pushrod. The shank is provided with a tapered end portion which diverges in the direction away from the pushrod and which end portion terminates in a shoulder stop. A plurality of jaw members are circumferentially spaced about the shank, each of the respective jaw members being mounted for relative movement longitudinally along the tapered portion of the shank. Accordingly, the members are provided with complementary inclined surfaces which are arranged to slide on the tapered end portion of the shank so as to effect the expansion or contraction thereof depending upon the direction in which the shank is moved through the tube. A holding ring retains the respective jaw members about the shank in a manner to permit relative longitudinal movement of the jaw members along the shank. A spring means is disposed about the shank for normally biasing the respective jaw members toward their operative expanded position.

---

This invention relates in general to a mandrel, and more specifically to an expandable mandrel for expanding a tubular member.

To secure a plurality of fins to a tubular member, as for example in the manufacturing of radiating equipment, and the like, it was customary to expand the tubular member to the fins placed thereon. Heretofore the tube was expanded by extending a pull rod through the tube and securing to the end thereof a mandrel, which when pulled back through the tube would cause the tube to expand and frictionally secure the fins thereto. The difficulty noted with this method of expanding tubes was that an operator had to be positioned at each end of the tube to be expanded. One operator was required to extend the rod through the tube while the other operator at the other end of the tube was required to connect the mandrel thereto. Accordingly, the mandrel was then pulled through the tube to effect the desired expansion. After the expansion operation the mandrel would then have to be removed from the rod prior to inserting the rod through a next tube to be expanded. Accordingly, a substantial amount of time, effort, and labor was expended in connecting and disconnecting the mandrel to and from the pull rod on each pass of the rod through the successive tubes to be expanded.

It is an object of this invention to provide an improved expanding mandrel which automatically retracts as the rod is initially passed through the bore of a tube, and which mandrel automatically expands to effect the expansion of the tube on reversing of the direction of the mandrel through the tube to be extended.

Another feature of this invention resides in an improved mandrel construction which is free to be readily passed through the tube in one direction without effecting expansion of the tube, and which is expanded to its operative expanding position when the mandrel is pulled through the tube in an opposite direction.

Another object of this invention is to provide an expanding mandrel in which the limits between the expansion and constraction thereof can be varied.

Another object of this invention is to provide an improved mandrel construction which is simple in construction, inexpensive to fabricate, and is positive in operation.

Another object of this invention is to provide a mandrel which can be readily expanded or retracted between operative and inoperative positions depending upon the direction in which the mandrel is moved through the bore of a tube.

The foregoing objects, and other features and advantages of this invention are attained by an expandable mandrel connected to the end of a push-pull rod which can be readily passed through a bore of a tube in both direction, but which will effect expansion of the tube when moved in one direction only. In accordance with this invention, the mandrel comprises a shank which may be detachably connected to the end of the pull rod. The shank is provided with a taper end portion which diverges in the direction away from the rod. The taper end portion terminates in a stop shoulder and a rounded head end. A plurality of jaw members are circumferentially spaced about the shank; each of the respective jaw members being mounted for longitudinal movement along the tapered portion of the shank. Accordingly, each jaw member is provided with a complementary inclined surface arranged to slide on the taper end portion of the shank to effect the expansion and contractions thereof. Means in the form of a holding ring retains the respective jaw members about the shank in a manner which permits relative longitudinal movement of the jaw members along the shank. Means are also provided for maintaining the circumferential spacing between adjacent jaws members. A spring means is disposed about the shank for normally biasing the respective jaw members toward their operative expanded position. If desired, a means may be provided for varying the limits or range between minimum retracted position and maximum expanded position of the jaw members. The latter means includes a series of washers of varying thickness which are adapted to be disposed between the shoulder stop and the adjacent end portion of the jaw members. Accordingly, the respective washers, depending on their relative widths, will vary the effective length of the taper thereby varying the limits of expansion and retraction of the jaw member movably mounted therealong.

A feature of this invention resides in the provision of an expanding mandrel in which the expandable limit or range of the jaw members can be varied.

Another feature of this invention resides in the provision wherein the respective jaw members of the mandrel are normally extended to their maximum operative expanded position, and are readily arranged so as to be retracted to an inoperative position when the mandrel is moved through the tube in one direction and to an expanded position when moved to the tube in the opposite direction.

Another feature of this invention resides in the provision of an expandable mandrel which can be moved in one direction through a tube without effecting the expansion thereof, and which when moved in the opposite direction will affect expansion of the tube.

Another feature of this invention resides in a novel expandable mandrel which can be moved in and out of the tube without affecting a disconnect between the mandrel and the rod pulling or pushing the same through a tube.

Other features and advantages will become more readily apparent when considered in view of the drawings and specification in which;

FIGURE 1 illustrates the improved mandrel construction of the instant invention illustrated in the inoperative position thereof as the same is moving through a tube to be expanded, and having parts shown in section.

FIGURE 2 is a view of the mandrel illustrated in FIG. 1 but showing the parts thereof in the expanded operative position thereof as the mandrel is being pulled through the tube to effect the expansion thereof.

FIGURE 3 is a sectional view taken along line 3—3 of FIG. 2.

Referring to the drawings, there is shown in FIGS. 1 and 2 a relatively thin wall tube 10, as for example a copper tube or the like, which is adapted to be expanded by the expanding mandrel 11 construction of the instant invention. In many industrial applications, it is desirable to expand a given tube 10 to increase its OD for many reasons. For example, in the heating and cooling field, radiation units are usually formed by securing a plurality of fins 13 to a tubular member 10 to enhance the radiation surface thereof. In such applications, the fins have central holes 12 through which the tube 10 extends and the fins 13 are secured to the external surface of the tube 10 by expanding the tube 10 to the fins 13. In accordance with this invention, an improved expanding mandrel 11 is provided to enhance and expedite the expanding of such tubular members for positively securing a series of radiation fins thereto. The expandable mandrel 11 is connected to the end of a push-pull rod 14 which carries the mandrel through the bore of a tube 10. As shown, one end of the pull rod 14 is provided with a topped opening 15 by which the mandrel 11 of the instant invention is detachably secured. The mandrel 11 comprises a shank 16 defined as cyclindrical shaft portion 16A and a connected tapered end portion 16B. As shown, the end of the shaft portion 16A is provided with external threads 16C by which the mandrel 11 is threadedly connected to the topped end 15 of the pull rod 14. The other end of the shank adjacent the taper end portion thereof is provided with a rounded head end portion 17 that has an OD which is substantially equal to or less the original ID of the tube to be expanded. As constructed the head end portion 17 defines with the taper end portion a shoulder stop 18.

A plurality of movable jaw members 19 are normally disposed about the tapered end portion 16B of the shank 16. In accordance with this invention, the respective jaw members 19 are arranged for longitudinal movement along the shank 16 of the mandrel. In the illustrated form of the invention, four such jaw members 19 are circumferentially spaced about the tapered end portion 16B of the shank. Each of the respective jaw members 19 comprises a relatively elongated member having the under surface 19A thereof provided with an inclined surface that complements the incline surface of the tapered end portion 16B of the shank. The outer surface of the respective jaw members are provided with one or more raised lands, 19B, 19C which in the assembled position of the jaw members 19 define a circumscribing land. The arrangement is such that the OD of the land in an expanded position of the jaw members 19 determines the expanded ID of the tube. If desired one or more lands 19B, 19C may be provided, in which case each land is progressively raised to effect a progressive expansion as the mandrel is moved through the tube during an expansion operation.

Means are provided for maintaining the jaw members 19 about the shank of the mandrel. In the illustrated form of the invention, it is to be noted that each of the respective jaw members 19 is provided with a transversely extending groove segment 20, which in the assembled position of the mandrel, are disposed to define a substantially annular groove. A retaining ring 21 is seated in the grooves to maintain the jaw members 19 about the shank of the mandrel.

A means is also provided for maintaining the relative circumferential spacing between the respective jaw members about the shank of the mandrel. In the illustrated form of the invention, this means comprises collar 22 which is slidably mounted on the cylindrical shaft portion of the shank. Accordingly, the end of the collar 22 adjacent the respective jaw member 19 is provided with a plurality of circumferentially spaced projecting fingers or webs 22A which are adapted to extend into the spacing defined between adjacent jaw members 19. The other end of the collar 22 is provided with a counter bore 22B which defines a seat for one end of a coil spring 23 which is disposed about the shaft portion 16A of the shank.

Threaded on the threaded portion of the shaft is a stop nut 24 which is utilized to adjust the threaded connection between the mandrel 11 and the push-pull rod 14. Disposed between the end of the spring 23 and the nut 24 is a bearing collar 25 which defines a seat for the end of the spring 23. Accordingly, it will be noted that the spring 23 is such that it maintains a bias on the respective jaw members 19 to normally maintain the jaws in their expanded position.

From the foregoing description, it will be readily apparent that the jaw members 19 are rendered longitudinally movable along the shank 16 of the mandrel, with the jaw 19 being normally biased to their expanded position due to the actoion of the spring 23 acting thereon. Consequently, in operation it will be noted that in pushing the push-pull rod 14 with the mandrel 11 secured thereto through the inlet end tube as shown in FIG. 1, and in the direction of arrow 26, the friction encountered between the walls of the tube and expanded jaws will cause the jaws 19 to compress the spring 23 and thereby retract to an inoperative position where the mandrel can easily pass through the tube 10. After the mandrel has been pushed through the entire length of the tube, the jaws will be moved to their normal expanded position due to the spring. Thus as the direction of force applied to the push-pull rod is reversed as indicated by arrow 27, FIG. 2, whereby the camming action affected between the tapered end portion 16B of the shank 16 and the jaw members 19 disposed thereabout forced the expanded jaws 19 to expand the tube an amount determined by the OD of the lands 19B, 19C. Thus the expanded ID of the tube 10 upon expansion will conform substantially to the OD of the land 19C on the jaw members 19.

In the illustrated form of the invention, two lands 19B, 19C are illustrated on each of the respective jaw members. The arrangement is such that the lands may be progressively increased in height to effect a progressive expansion as the mandrel is pulled through the tube. In this manner a progressive expansion is provided with the final internal diameter of the tube being defined to the OD of the largest land height formed on the respective jaw members.

Accordingly, it will be noted that successive expanding operations may be performed on a run of tubes without ever effecting the removal of the mandrel 11 from the push-pull rod 14, thereby substantially minimizing the amount of time, effort, and labor heretofore required to effect the same expansion operation.

If desired, the range or expanding limits between minimum and maximum positions of the respective jaw members 19 can be varied within prescribed limits. With the structure described, this can be readily attained by the interposition of one or more sizing washers or spacers 28 between the stop shoulder 18 on the shank 16 and the adjacent end portion of the respective jaw member 19. Accordingly, the thickness and/or number of the respective sizing washers 28 disposed about the shank adjacent the shoulder stop 18 will vary the effective length of the taper on the taper end portion, and consequently limit the maximum expansion possible of the respective draw members.

While the instant invention has been described with

What is claimed is:
1. An expandable mandril comprising:
  (a) a shank having a shaft portion and a connected tapered end portion which can be readily passed through the bore of a tube in either direction,
  (b) said taper end portion diverging outwardly from the connected shaft portion of said shank,
  (c) a plurality of jaw means slidably mounted on said shank for movement toward and away from said tapered end portion to effect automatic expansion and contractions of said jaw means accordingly as said mandrel is moved through the tube in one direction or the other,
  (d) means for retaining said jaw means on said shank in a manner to permit limited longitudinal movement thereof relative to said shank, between expanded and contracted positions,
  (e) means for maintaining the spacing of said jaw means about said shank, and
  (f) spring means for exerting a bias on said jaw means whereby said jaw means are displaced to a contracted position against the bias of the spring as the mandrel is passed through the tube in one direction and whereby said jaws being automatically displaced to an expanded position when said mandrel is moved through the tube in the opposite direction.

2. The invention as defined in claim 1 wherein:
  (a) said tapered end portion terminates in a rounded head, and
  (b) said head defining a shoulder stop to limit the movement of said jaw means toward the expanded position thereof.

3. The invention as defined in claim 2 and including means for varying the effective length of said taper end portion to vary the expanding limits of said jaw means.

4. The invention as defined in claim 1 wherein:
  (a) each of said jaw means includes a member having an incline undersurface complementing the taper of said tapered end portion,
  (b) said member circumscribing a segmental cross-sectional portion of said shank, and
  (c) a transversely extending land formed on the outer surface thereof.

5. The invention as defined in claim 4 wherein:
  (a) each of said jaw members includes a transversely extending groove formed adjacent the end thereof, and
  (b) a holding ring adapted to be seated in said groove for retaining said jaw members on said shank in a manner permitting each of said jaw members to be moved in unision between their respective expanded and contracted positions.

6. The invention as defined in claim 1 wherein said means for maintaining the spacing of said jaw means includes:
  (a) a collar slidably mounted on said shank,
  (b) said collar having projecting fingers adapted to extend into the spacing defined between adjacent jaw means to maintain the spacing therebetween in moving between an expanded and retracted position thereof.

7. An expandable mandrel for expanding a tubular member comprising:
  (a) a push-pull rod adapted to be extended through the bore of a tube to be expanded,
  (b) a shank connected to the end of said rod,
  (c) said shank having a tapered end portion, said tapered end portion diverging in a direction away from said rod, and
  (d) said tapered end portion terminating in a shoulder stop,
  (e) a plurality of jaw members circumferentially spaced about said shank, said jaw members being mounted for movement longitudinally of said shank for movement between an expanded and contracted position,
  (f) said jaw members having an undersurface portion complementing the incline surface of said tapered end portion,
  (g) a holding ring for maintaining said jaw members about said shank,
  (h) a sliding collar mounted on said shank,
  (i) said collar having means for maintaining the spacing of said jaws about said shank,
  (j) and, a spring means disposed about said shank between said rod and said collar for normally biasing said jaw members to their expanded position.

8. An expandable mandrel for expanding a tubular member comprising:
  (a) a shank adapted to be connected to the end of a push-pull rod,
  (b) said shank having a tapered end portion diverging in a direction away from said rod, and
  (c) said tapered end portion terminating in a shoulder stop,
  (d) a plurality of jaw members circumferentially spaced about said shank, said jaw members being mounted for movement longitudinally of said shank between an expanded and contracted position,
  (e) said jaw members having an inner surface portion complementing the incline surface of said tapered end portion,
  (f) a holding ring for maintaining said jaw members about said shank,
  (g) a sliding collar mounted on said shank,
  (h) said collar having means for maintaining the spacing of said jaws members about said shank,
  (i) and, a spring means disposed about said shank for normally biasing said jaw members to their expanded position,
  (j) and means for varying the expandable range of said jaw members,
  (k) said latter means including sizing washers disposed between the shoulder stop and said jaw members to vary the effective length of said taper end portion.

9. A mandril for expanding a tubular member on pulling said mandril through the bore of said tubular member comprising:
  (a) a push-pull rod adapted to be inserted into the bore of a tube to be expanded,
  (b) a shank having a cylindrical shaft portion and a connected taper end portion connected to the end of said rod,
  (c) said shank terminating in a rounded head defining a shoulder stop adjacent the larger end of said tapered portion,
  (d) a plurality of jaw members circumferentially spaced about said shank,
  (e) each of said jaw members having an inclined undersurface complementing the taper of said tapered end portion, and said jaw members having a circumscribing land which in the expanded position thereof is adapted to engage the internal surface of a tube to effect expansion thereof as said mandril is pulled therethrough,
  (f) a means for retaining said jaw members about said shank for movement between an expanded and contracted position,
  (g) collar means for maintaining the circumferential spacing of said jaw members about said shank,
  (h) a bearing ring spaced from said collar disposed on said shank,
  (i) and a spring means coiled about the shaft portion of said shank, (j) said spring means being disposed between the bearing ring and said collar means for normally biasing said jaw members toward the expanded position thereof, (k) said spring being free to compress as said mandril is pushed through a tubular member to effect retraction of said jaw members to allow said mandril to be passed through said tube in one direction without expanding the tubular member.

10. A mandril for expanding a tubular member on pulling said mandril through the bore of said tubular member comprising:
(a) a push-pull rod adapted to be inserted into the bore of a tube to be expanded,
(b) a shank connected to the end of said rod,
(c) said shank having a connected taper end portion terminating in a rounded head defining a shoulder stop adjacent the larger end of said tapered portion,
(d) a plurality of jaw members circumferentially spaced about said shank,
(e) each of said jaw members having an inclined undersurface complementing the taper of said tapered end portion, and each of said jaw members having formed thereon a circumscribing land which in the expanded position of said jaw members are adapted to engage the internal surface of a tube to effect expansion thereof as said mandril is pulled through said tube,
(f) a means for retaining said jaw members about said shank for movement between an expanded and contracted position,
(g) means for maintaining the circumferential spacing of said jaw members about said shank,
(h) said latter means including a collar having extending fingers,
(i) said fingers extending into the spacing between adjacent jaw members,
(j) a bearing ring spaced from said collar disposed on said shank,
(k) and a spring means coiled about the shaft portion of said shank,
(l) said spring means being disposed between the bearing ring and said collar for normally biasing said jaw member toward the expanded position thereof,
(m) said spring being free to compress as said mandril is pushed through a tubular member to effect retraction of said jaw members to allow said mandril to pass through said tube in one direction without expanding the tubular member.

11. A mandril for expanding a tubular member on pulling said mandril through the bore of said tubular member comprising:
(a) a push-pull rod adapted to be inserted into the bore of a tube to be expanded,
(b) said rod having a tapped hole formed in the end thereof,
(c) a shank having a threaded end portion threaded into said tapped hole of said rod,
(d) a nut threaded on the end of said shank,
(e) said shank having a cylindrical shaft portion and a connected taper end portion,
(f) said shank terminating in a rounded head defining a shoulder stop adjacent the larger end of said tapered portion,
(g) a plurality of jaw members disposed about said shank,
(h) each of said jaw members having an inclined undersurface complementing the taper of said tapered end portion, said jaw members being formed with a circumscribing land which in the expanded position thereof is adapted to engage the internal surface of a tube to effect expansion thereof as said mandril is pulled therethrough,
(i) a means for retaining said jaw members about said shank,
(j) said latter means including a groove defined adjacent the end portion of said jaw members, and a retaining ring seated in said groove whereby said jaw members are free to slide longitudinally of said shank between an expanded and contracted position,
(k) means for maintaining the circumferential spacing of said jaw members about said shank,
(l) said latter means including a collar having extending fingers,
(m) said fingers extending into the spacing between adjacent jaw members,
(n) a bearing ring spaced from said collar disposed on said shank,
(o) and a spring means coiled about the shaft portion of said shank,
(p) said spring means being disposed between the bearing ring and said collar for normally biasing said jaw member toward the expanded position thereof,
(q) said spring being free to compress as said mandril is pushed through a tubular member to effect retraction of said jaw members to allow said mandril to pass through said tube in one direction without expanding the tubular member,
(r) and means disposed between said stop shoulder and adjacent ends of said jaw members to vary the effect length of said tapered end portion to vary the expansion and contraction limits of said jaw member,
(s) said latter means including a washer of predetermined thickness.

References Cited

UNITED STATES PATENTS

| | | | |
|---|---|---|---|
| 220,651 | 10/1879 | Pagan | 72—393 |
| 269,811 | 12/1882 | Orcutt et al. | 72—355 |
| 2,319,216 | 5/1943 | Dewald | 72—393 |
| 2,672,175 | 3/1954 | Howard | 72—393 |

RICHARD J. HERBST, *Primary Examiner.*

L. A. LARSON, *Assistant Examiner.*